June 21, 1949. LE ROY S. DUNHAM ET AL 2,473,943
METHOD OF IMPREGNATING CARBONACEOUS BODIES
Filed April 6, 1945
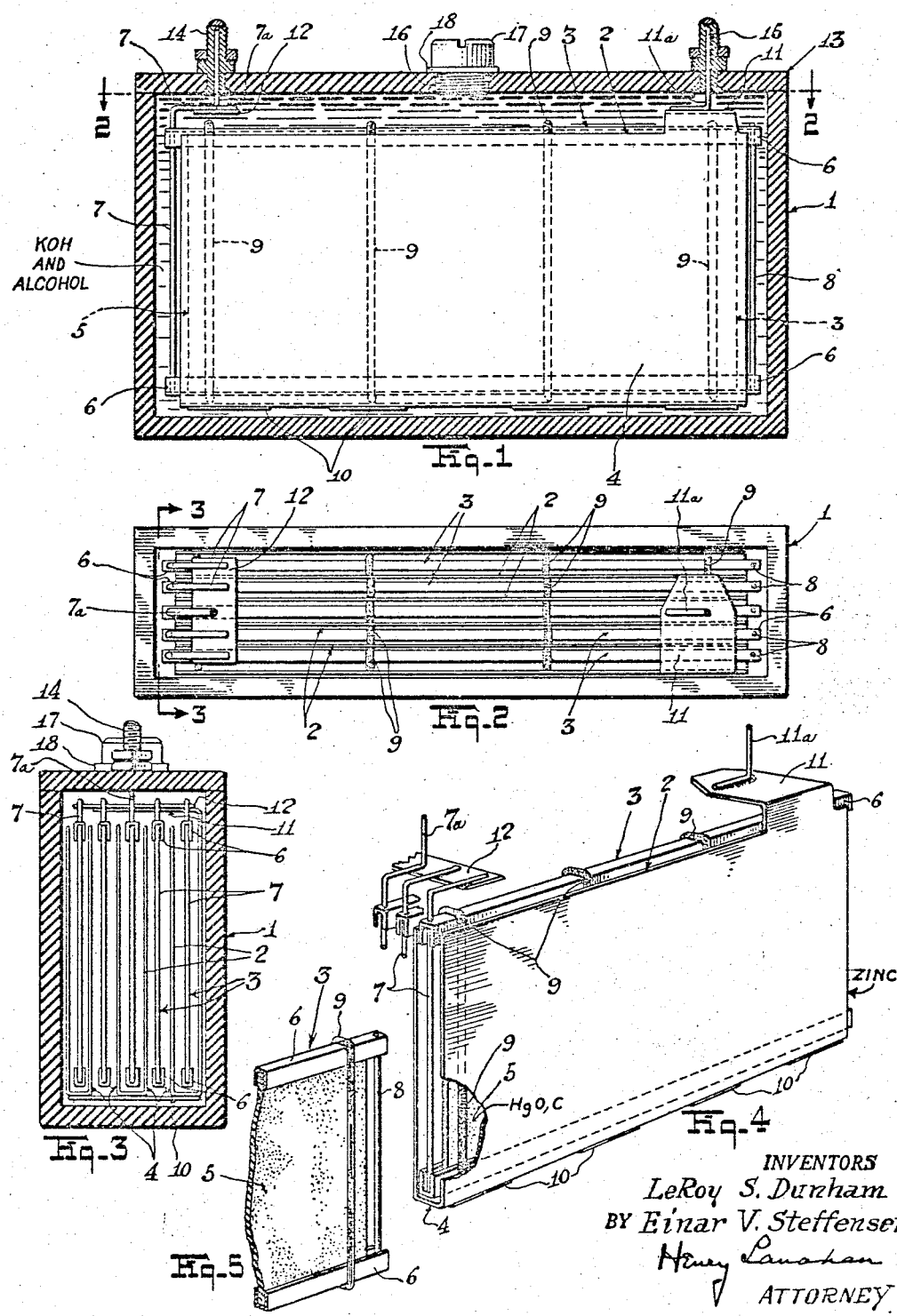
INVENTORS
LeRoy S. Dunham
BY Einar V. Steffensen
Henry Lanahan
ATTORNEY Patented June 21, 1949

2,473,943

UNITED STATES PATENT OFFICE 2,473,943

METHOD OF IMPREGNATING CARBONACEOUS BODIES

Le Roy S. Dunham, East Orange, and Einar V. Steffensen, Belleville, N. J., assignors to Thomas A. Edison, Incorporated, West Orange, N. J., a corporation of New Jersey Application April 6, 1945, Serial No. 586,950

1 Claim. (Cl. 117—121)

Our invention relates to novel primary cells and to novel depolarizing electrodes for such cells, and is especially adapted to fulfill the need for small cells of high service capacity.

In accordance with our invention, we have devised an improved electrode of the type comprising porous carbon impregnated with mercuric oxide. This electrode is characterized as having a remarkably high percentage of impregnation, a substantial strength structurally and good electrical conductivity, and it is an object of our invention to provide such an electrode having these improved characteristics.

Another object is to provide a new and improved process for producing such an improved electrode.

It is another object to provide an improved depolarizing electrode, or cathode, for primary cells having an improved space efficiency enabling the construction of smaller cells with higher service capacity.

It is another object to provide a novel construction of primary cell wherein this improved electrode is advantageously employed.

Other objects and features of our invention will appear from the following description and the appended claim.

In the description of our invention reference is had to the accompanying drawings, of which:

Figure 1 is an elevational view, partly in vertical section, showing a preferred construction of primary cell incorporating our invention;

Figure 2 is a view taken substantially on the line 2—2 of Figure 1;

Figure 3 is a vertical sectional view taken on the line 3—3 of Figure 2, but omitting the spacers between the electrodes.

Figure 4 is a fractional perspective view of the electrode assembly of the present illustrative embodiment; and Figure 5 is a fractional perspective view of a cathode assembly according to the present invention.

In the accompanying figures we show a preferred construction of a primary cell of a deferred action-high current according to our invention. This cell has a rectangular case 1 preferably molded of a suitable plastic such as polystyrene. Within the case is an electrode assembly comprising a series of alternately-arranged anodes and cathodes 2 and 3 disposed vertically in spaced parallel relation to one another. Successive pairs of the anodes consist of single sheets 4 of amalgamated zinc folded into a U shape. Within and between these sheets 4 are the successive cathodes 3. These cathodes consist of plates 5 of porous carbon impregnated with mercuric oxide according to our invention as is hereinafter particularly described. Long thin plates of the impregnated carbon material, such as are preferably employed in the present variety of battery, are somewhat frangible and need therefore to have a supporting frame. This frame consists of top and bottom channel members 6 joined mechanically and electrically at the ends by wire members 7 and 8. The channel members are for example apertured at the ends to receive the wire members after the plates 5 are set therein, and the wire members are then secured to the channel members by soldering. The channel members and wire members may be made of steel, Monel, nickel plated base metal, and the like.

The cathodes and anodes are spaced from one another by surrounding bands or cords 9 of cotton or rubber, this being a preferred way of effecting the spacing because it provides the least obstruction between adjacent electrodes and improves therefore the performance of the battery.

The sheets 4 are joined to one another at the bottom by zinc strips 10 soldered thereto and one of the outer sheets has a lug 11 turned over at the top to which is soldered a wire 11a. This wire serves as a means for making electrical connection to the anode group. One set of the wire members 7 of the cathodes extend above the top channel members 6 and are soldered together, as to a conducting strip 12; but one intermediate one of these wire members, referred to as 7a in Figure 4, is extended upwardly to form a means for making electrical connection to the cathode group.

The case 1 has a cover 13 provided with a pair of hollow terminals 14 and 15 which are sealed liquid-tight thereto. The wires 7a and 11a are threaded through these terminals as the cover is mounted in place, and then the cover is sealed by plastic cement to the case and the terminals are sealed and joined to the wires by soldering. The cover has a central filler opening 16 which is closed liquid-tight prior to the introduction of electrolyte by a screw plug 17 and gasket 18. The electrolyte to be added is a solution of caustic alkali. At the time of adding the electrolyte, the gasket 18 may be discarded and the plug reinserted so as to provide a splash-resistant closure which will let out the internal gases.

There is some tendency for a porous carbon body impregnated with a water-soluble salt to develop surface areas which will not wet easily by caustic alkali electrolyte, it being understood that wetting is essential to get the electrolyte in association with the cathode so that the cell will operate. This tendency is believed to be due to an excess of the water-soluble salt being formed on the surface of the carbon body, and may also be caused by organic solvents which may be used in the sealing cement used on the case. We find that this non-wetting difficulty may however be readily overcome by adding to the electrolyte a small percentage of alcohol, say 5%.

The present cell of our invention is distinguished by an unusually high efficiency in respect of its service capacity per unit volume thereof. A feature of this cell which contributes particularly to this high efficiency is in the use of carbon cathode bodies—the plates 5—which are impregnated with unusually large amounts of mercuric oxide. As a first requirement to obtain this high degree of impregnation, we employ a special carbonaceous material—which serves as a skeleton for the depolarizing or active material of the cathode—having a markedly high degree of porosity and, by the same token, a relatively low apparent density. Preferably, we employ carbon bodies having a porosity between 50% and 60%—the term "percentage porosity" being employed to mean the ratio of volume of air space to total occupied space of the whole body—and having a density between .9 and 1.2 g. per cu. cm. It is to be understood, however, that our invention contemplates the use, as well, of other porous conductive bodies such as of metal, which are made so as to have a like percentage porosity.

A carbon body having the physical characteristics above described has been produced in accordance with our invention by mixing four parts by weight of finely ground coke (preferably 100 mesh) with one part by weight of finely ground gilsonite and enough of a saturated solution of ammonium chloride to form a plastic mass, a satisfactory mix being obtained for instance by mixing these ingredients in a ratio of 80 g. of the coke with 20 g. of the gilsonite and 9 cu. cm. of ammonium chloride. This mix is then placed in a die under pressure of approximately 2½ tons per sq. in., thereafter dried and then fired in a furnace out of contact with air at a temperature between 1600° F. and 1700° F. The carbon bodies so formed are self-sustaining blocks of essentially pure retort carbon, or a substantial equivalent thereof, and have an apparent density of .97 and a porosity of between 50% and 60%. By using coke of different fineness, the porosity may however be varied.

These carbon bodies are impregnated with mercuric oxide by an improved method according to our invention, which is as follows: A brine solution of mercuric chloride is made by mixing approximately 66.7% mercuric chloride ($HgCl_2$) with 24.7% water and 8.6% common salt ($NaCl$). The carbon body is saturated with this mercuric chloride solution, for instance, by immersing the body therein under a vacuum or while the solution is at a temperature of approximately 100° C. The body is then removed and dried at approximately 100° C. Thereafter, the body is immersed in a hot (typically 60° C.) 20% solution of caustic alkali, preferably caustic soda, and let stand therein for approximately one to two hours. In this step caustic alkali reacts with the mercuric chloride and precipitates mercuric oxide, leaving the oxide distributed throughout the pores of the carbon body. After this precipitation is completed, the carbon body is removed from the caustic soda solution, washed with water and dried at approximately 100° C.

The above described series of steps completes one cycle in the process of impregnating the carbon body with mercuric oxide. This cycle is repeated until the body is impregnated to the desired degree, the number of cycles required depending primarily upon the thickness of the carbon body. For example, we find five cycles are generally sufficient for a carbon body $\tfrac{1}{16}$" thick.

By the above described impregnating process, we are able in five cycles to incorporate as much as 6 g. of mercuric oxide into a carbon body 2" square and $\tfrac{1}{16}$" thick. This is an impregnation of the order of 1.5 g. of mercuric oxide per cu. cm. of the carbon body, which is an impregnation equal approximately to .0137 faradic equivalents per cu. cm. Moreover, this process leaves no end products in the carbon body which have any resultant harmful effects. While we may use other mercuric salts for this starting solution, say mercuric nitrate, this is not as desirable because if some of the nitrate were left as a residue it would have a destructive action on the carbon body. Mercuric chloride has however no such destructive action.

The carbon material itself of the cathode serves as a skeleton or framework for carrying the depolarizing material and for conducting the current therefrom. Since the amount of active material which is incorporated into the porous cathode body determines the capacity of the cell, the service capacity per unit of overall volume of the cell is made very great. Also, this cathode does not cause appreciable expansion of the electrolyte or undue gassing during operation of the cell, which is very important in most battery applications. It is moreover an advantageous characteristic of this cathode that it functions reliably and efficiently at extremely low temperatures.

It will be apparent to those skilled in the art that the carbon body herein described may be impregnated with other depolarizing materials to form improved cathodes for primary cells. For instance, such other materials may comprise the oxides of copper and silver, the nitrates of silver and mercury, or the chlorides of copper and mercury. It is found however that electrodes resulting from the use of these other materials are much inferior to those which are impregnated with mercuric oxide.

The following quantitative data is illustrative of the high performance which is attainable in primary cells by the use of our invention: The cell herein specifically described has five impregnated carbon plates each approximately $\tfrac{1}{16}$" thick by 2" high by 4" long, and six associated zinc anode plates approximately .006" thick and dimensions in height and length like those of the carbon plates. This electrode assembly mounts readily into a container which is 1⅛" thick by 2½" high by 4½" long. When the container is filled with a caustic alkali solution of suitable strength, preferably a 30% solution of potassium hydroxide, the cell will supply continuously for four hours 2 amp. of current at approximately 1.3 average volts, and will do so at temperatures as low as −40° F. This is an unusually high service capacity per volume and weight of the cell.

The embodiment of our invention herein shown and described is intended as being illustrative and not necessarily limitative of our invention as the same is subject to changes and modifications without departure from the scope of our invention, which we endeavor to express according to the following claim.

We claim:

The method of impregnating a coherent carbonaceous body having a porosity of the order of 50% or more, which comprises introducing into said body a brine solution of a mercuric salt composed approximately of 66.7% mercuric chloride, 24.7% water and 8.6% sodium chloride, drying said body, immersing said body in a solution of caustic alkali having a temperature of the order of 60° C. so as to precipitate mercuric oxide within said body throughout the pores thereof, and repeating said process until approximately 1.5 grams of mercuric oxide are deposited within said body per cu. cm. of volume thereof.

LE ROY S. DUNHAM.
EINAR V. STEFFENSEN.

REFERENCES CITED

The following references are of record in the file of this patent:

UNITED STATES PATENTS

| Number | Name | Date |
|---|---|---|
| 270,884 | Berliner | Jan. 23, 1883 |
| 286,809 | Haid | Oct. 16, 1883 |
| 291,526 | Molera et al. | Jan. 8, 1884 |
| 375,034 | Wilder | Dec. 20, 1887 |
| 408,358 | Schroeder | Aug. 6, 1889 |
| 1,055,560 | Schoenmehl | Mar. 11, 1913 |
| 1,126,295 | Saltzman | Jan. 26, 1915 |
| 1,285,054 | French et al. | Nov. 19, 1918 |
| 1,391,211 | Ruhoff | Sept. 20, 1921 |
| 1,434,469 | Wilker | Nov. 7, 1922 |
| 1,874,725 | Wheat | Aug. 30, 1932 |
| 1,997,391 | Pautou | Apr. 9, 1935 |
| 2,178,969 | Ruben | Nov. 7, 1939 |

FOREIGN PATENTS

| Number | Country | Date |
|---|---|---|
| 9,991 | Great Britain | 1886 |

OTHER REFERENCES

Lowry, Inorganic Chemistry, MacMillan & Co. Ltd., London, 1931, p. 907.